(12) United States Patent
Caci (10) Patent No.: US 7,599,289 B2
(45) Date of Patent: Oct. 6, 2009

(54) ELECTRONIC COMMUNICATION CONTROL

(75) Inventor: J. Claude Caci, Owego, NY (US)

(73) Assignee: Lockheed Martin Corporation, Bethesda, MD (US)

(*) Notice: Subject to any disclaimer, the term of this patent is extended or adjusted under 35 U.S.C. 154(b) by 700 days.

(21) Appl. No.: 11/128,168

(22) Filed: May 13, 2005

(65) Prior Publication Data

US 2006/0256716 A1 Nov. 16, 2006

(51) Int. Cl.
H04J 3/14 (2006.01)
H04L 9/32 (2006.01)
H04L 12/66 (2006.01)
G06F 13/10 (2006.01)

(52) U.S. Cl. .................. 370/230; 370/401; 370/469; 370/466; 370/535; 726/13; 726/23; 726/27

(58) Field of Classification Search ................ 370/229, 370/230, 401, 465, 469, 466, 535; 726/13, 726/22, 23, 26, 27
See application file for complete search history.

(56) References Cited

U.S. PATENT DOCUMENTS

| | | | |
|---|---|---|---|
| 6,038,233 A | 3/2000 | Hammamoto et al. |
| 6,118,784 A | 9/2000 | Tsuchiya et al. |
| 6,240,407 B1 | 5/2001 | Chang et al. |
| 6,243,380 B1 | 6/2001 | Malking |
| 6,389,532 B1 | 5/2002 | Gupta et al. |
| 6,421,656 B1 | 7/2002 | Cheng et al. |
| 6,456,308 B1 | 9/2002 | Agranat et al. |
| 6,456,624 B1 | 9/2002 | Eccles et al. |
| 6,510,434 B1 | 1/2003 | Anderson et al. |
| 6,556,986 B2 | 4/2003 | Hara et al. |
| 6,567,405 B1 | 5/2003 | Borella et al. |
| 6,580,717 B1 | 6/2003 | Higuchi et al. |
| 6,631,136 B1 | 10/2003 | Chowdhury et al. |

(Continued)

FOREIGN PATENT DOCUMENTS

EP 1331792 7/2003

(Continued)

OTHER PUBLICATIONS

Udell, Jon, "Lightweight XML Search Servers", Jan. 21, 2004.

(Continued)

*Primary Examiner*—Chi H Pham
*Assistant Examiner*—Ahmed Elallam
(74) *Attorney, Agent, or Firm*—Miles & Stockbridge PC; James T Carmichael (57) ABSTRACT

An electronic communication control device suitable for embedding into a network interface card or a line card of a switch or router. The electronic communication control device is capable of communications in multiple protocols. The processing architecture of the electronic communication control device may be adapted for any communications protocol and may be well suited for Internet protocol. The electronic communication control device may perform protocol translation, for example, between IPv4 and IPv6. An exemplary embodiment of the electronic communication control device includes a parallel processing chipset operating on multiple busses with embedded software. The electronic communication control device provides a hardware architecture upon which embedded software may operate to provide services, such as, for example, system control, packet analysis, packet filtering, translation services, switching, routing and/or multiplexing control.

19 Claims, 5 Drawing Sheets

U.S. PATENT DOCUMENTS

| | | | |
|---|---|---|---|
| 6,721,727 | B2 | 4/2004 | Chau et al. |
| 6,732,109 | B2 | 5/2004 | Lindberg et al. |
| 6,782,380 | B1 | 8/2004 | Thede |
| 6,804,677 | B2 | 10/2004 | Shadmon et al. |
| 6,898,632 | B2 * | 5/2005 | Gordy et al. ................ 709/224 |
| 7,155,502 | B1 | 12/2006 | Galloway et al. |
| 7,188,191 | B1 * | 3/2007 | Hovell et al. ................ 709/245 |
| 7,254,781 | B1 | 8/2007 | Land et al. |
| 7,257,564 | B2 | 8/2007 | Loughmiller et al. |
| 7,412,726 | B1 * | 8/2008 | Viswanath ................... 726/26 |
| 2001/0040895 | A1 | 11/2001 | Templin |
| 2001/0053156 | A1 | 12/2001 | Higuchi et al. |
| 2002/0032871 | A1 | 3/2002 | Malan et al. |
| 2002/0133586 | A1 | 9/2002 | Shanklin et al. |
| 2002/0147726 | A1 | 10/2002 | Yehia et al. |
| 2002/0150112 | A1 | 10/2002 | Tsuchiya et al. |
| 2002/0154624 | A1 | 10/2002 | Oishi et al. |
| 2002/0159461 | A1 | 10/2002 | Hamamoto et al. |
| 2002/0181465 | A1 | 12/2002 | Tsuchiya et al. |
| 2002/0181500 | A1 | 12/2002 | Higuchi et al. |
| 2003/0004998 | A1 | 1/2003 | Datta |
| 2003/0018661 | A1 | 1/2003 | Darugar |
| 2003/0046427 | A1 | 3/2003 | Goringe et al. |
| 2003/0048804 | A1 | 3/2003 | Inouchi et al. |
| 2003/0061345 | A1 | 3/2003 | Kawasaki et al. |
| 2003/0097447 | A1 | 5/2003 | Lapuh et al. |
| 2003/0110292 | A1 | 6/2003 | Takeda et al. |
| 2003/0123393 | A1 | 7/2003 | Feuerstraeter et al. |
| 2003/0149790 | A1 | 8/2003 | Hwang |
| 2003/0149934 | A1 | 8/2003 | Worden |
| 2003/0185236 | A1 | 10/2003 | Asano et al. |
| 2003/0187882 | A1 | 10/2003 | Jinmei et al. |
| 2003/0188191 | A1 | 10/2003 | Aaron et al. |
| 2003/0193965 | A1 | 10/2003 | Higuchi et al. |
| 2003/0200301 | A1 | 10/2003 | Trzcinko et al. |
| 2003/0204511 | A1 | 10/2003 | Brundage et al. |
| 2003/0212664 | A1 | 11/2003 | Breining et al. |
| 2003/0223402 | A1 | 12/2003 | Sanchez et al. |
| 2004/0001492 | A1 | 1/2004 | Johnson |
| 2004/0044771 | A1 | 3/2004 | Allred et al. |
| 2004/0057441 | A1 | 3/2004 | Li et al. |
| 2004/0060007 | A1 | 3/2004 | Gottlob et al. |
| 2004/0064581 | A1 | 4/2004 | Shitama et al. |
| 2004/0071087 | A1 | 4/2004 | Siev et al. |
| 2004/0107287 | A1 | 6/2004 | Ananda et al. |
| 2004/0128617 | A1 | 7/2004 | Oh |
| 2004/0143599 | A1 | 7/2004 | Shalabi et al. |
| 2004/0153448 | A1 | 8/2004 | Cheng et al. |
| 2004/0157202 | A1 | 8/2004 | Hopkins et al. |
| 2004/0162909 | A1 * | 8/2004 | Choe et al. ................ 709/230 |
| 2004/0167985 | A1 * | 8/2004 | Jamitzky et al. ............ 709/230 |
| 2004/0205082 | A1 | 10/2004 | Fontoura et al. |
| 2004/0205571 | A1 | 10/2004 | Adler et al. |
| 2004/0205609 | A1 | 10/2004 | Milton et al. |
| 2004/0240468 | A1 | 12/2004 | Chin et al. |
| 2004/0258051 | A1 | 12/2004 | Lee |
| 2005/0004892 | A1 | 1/2005 | Brundage et al. |
| 2005/0010761 | A1 * | 1/2005 | Remedios et al. ........... 713/164 |
| 2005/0021548 | A1 | 1/2005 | Bohannon et al. |
| 2005/0055336 | A1 | 3/2005 | Hui et al. |
| 2005/0060317 | A1 | 3/2005 | Lott et al. |
| 2005/0182829 | A1 | 8/2005 | King et al. |
| 2005/0198500 | A1 * | 9/2005 | Gaur et al. ................... 713/164 |
| 2005/0256975 | A1 * | 11/2005 | Kaniz et al. ................ 709/250 |
| 2005/0259649 | A1 | 11/2005 | Smith |
| 2005/0265259 | A1 | 12/2005 | Thubert et al. |
| 2005/0267978 | A1 | 12/2005 | Satapati |
| 2006/0075093 | A1 * | 4/2006 | Frattura et al. .............. 709/224 |
| 2006/0089987 | A1 | 4/2006 | Igarashi et al. |
| 2006/0104308 | A1 * | 5/2006 | Pinkerton et al. ........... 370/469 |
| 2006/0114908 | A1 * | 6/2006 | Kalkunte et al. ............ 370/392 |
| 2006/0133377 | A1 * | 6/2006 | Jain ........................... 370/392 |
| 2006/0227724 | A1 | 10/2006 | Thubert et al. |

FOREIGN PATENT DOCUMENTS

| | | |
|---|---|---|
| JP | 2001285366 | 9/2000 |
| JP | 2000253064 | 10/2001 |
| JP | 2003087336 | 3/2003 |
| WO | WO 03041365 | 5/2003 |

OTHER PUBLICATIONS

Qualls, Michael, "Searching an XML File with XSL and ASP".
"XML and Search"; http://www.searchtools.com/info/xml.html.
U.S. Appl. No. 11/128,173, filed May 13, 2005, J. Claude Caci.
U.S. Appl. No. 11/128,388, filed May 13, 2005, J. Claude Caci.
U.S. Appl. No. 11/128,165, filed May 13, 2005, J. Claude Caci.
Power PC® 440, High performance, 1000 MIPS, superscalar core for custom logic applications.
Macro Product Selection Guide from IBM Microelectronics Division.
*IPv6 Integration and Coexistence Strategies for Next-Generation Networks*, by Malllik Tatipamula, Patrick Grossetete of Cisco Systems and Hiroshi Esaki of Tokyo University, IEEE Communications Magazine Jan. 2004, pp. 88-96.
*Study and Emulation of IPv6 Internet-Exchange-Based Addressing Models*, by David Fernandez and Tomas de Miguel, of Madrid Polytechnic University and Fermin Galan, of Agora Systems S.A., IEEE Communications Magazine, Jan. 2004, pp. 105-112.
Office Action dated Apr. 16, 2008, in U.S. Appl. No. 11/128,173.
Office Action dated Dec. 22, 2008, in U.S. Appl. No. 11/128,173.
Office Action dated Jan. 22, 2009, in U.S. Appl. No. 11/128,165.
Office Action dated Jul. 28, 2008, in U.S. Appl. No. 11/128,165.
Office Action dated Sep. 18, 2008, in U.S. Appl. No. 11/128,388.
Office Action dated Dec. 1, 2008, in U.S. Appl. No. 11/128,388.
Final Office Action dated May 29, 2009 in U.S. Appl. No. 11/128,388.

* cited by examiner

ELECTRONIC COMMUNICATION CONTROL

The present invention relates generally to electronic communication and, in particular, to controlling computer communications over a network.

The inventor has identified a limitation in the distributed multiplexing nature of routing and switching data packets between sender and receiver in computer networks and, in particular, the Internet. The limitation is a lack of multiplexing control, which lack may permit an individual, or other entity, to send an unwanted communication over a network. Unwanted communications may have an associated cost of resources required to process any unwanted data packets making up the unwanted communication.

A need may exist for an electronic communication control device or system that will allow networked computer users, for example, Internet users, to connect to the network safely and use the network, while preventing abusive users from accessing their computers or communicating with them.

In an exemplary embodiment, an electronic communication control device of the present invention provides multiplexing control, which may allow users to save time, computer capacity, and telecommunications capacity by reducing or eliminating unwanted data processing. In another exemplary embodiment, the electronic communication control device of the present invention comprises a hardware device for controlling, analyzing and monitoring network traffic. The functions of the electronic communication control device may permit the system to block unwanted traffic while allowing the desired traffic to proceed. An exemplary embodiment of the present invention may provide a means for matching receivers with senders based on criteria in order to control communications at a lower level than is typically performed. The criteria may be set by a network user or on behalf of a user, or a group of users, by an administrator.

BRIEF DESCRIPTION OF THE DRAWINGS

The present invention will be described with reference to the accompanying drawings, wherein.

DETAILED DESCRIPTION

In the exemplary embodiments shown in the figures and described below, it may be shown how communications through transmission control protocol (TCP)/internet protocol (IP) addresses and ports can be controlled and managed by an electronic communication control device in accordance with the present invention. However, it should be appreciated that an electronic communication control device in accordance with the present invention may be utilized with any known and/or later developed network protocols and/or network types such as Ethernet, fiber optic, radio frequency, and/or any known or later developed communications methods.

The Internet Protocol (IP) standard contains a protocol field that identifies the next lower level TCP, called a port. Ports are the numerical names of the logical link ends. Ports identify packets like mail and hypertext. Ports provide end point application mapping to unknown callers. A certain number of ports may be defined as well-known ports, which are used for particular purposes, such as, for example, port 80 is typically used for hypertext. The well-known ports are common across a variety of operating systems and allow the different operating systems to interoperate by specifying how communications and transactions are processed. The Internet Engineering Task Force (IETF) has stipulated that to the extent possible the same TCP port assignments are used with user datagram protocol (UDP) service. UDP is often associated with custom applications. Custom applications or proprietary applications can often skirt rules and standards designed for interoperability between different computer systems. For example an email program can be designed to follow IETF request for comment (RFC) standards. RFCs are the working notes of the Internet research and development community and typically contain protocol and model descriptions, experimental results, and reviews. Internet standard protocols are, by process, written up as RFCs. A software developer can introduce an email program that runs proprietary connections and IETF RFC standards at the same time, such as, for example, Microsoft Outlook™, Qualcomm Eudora™, and the open standard SendMail. In contrast to these email programs, it may be difficult to write email filter and antivirus software capable of performing the security functions that a physical electronic communication control device is capable of, such as, becoming a control link in the communications chain, uniquely enforcing communications policy while remaining invisible to the application and processing the communications data at an acceptable rate.

Within the Internet regulatory and user communities, a transition from IPv4 to IPv6 is occurring. Under IPv4, a network address is comprised of 32 bits. Under IPv6, a network address is comprised of 128 bits. Different software may be required to process IPv6 message traffic. The number of Internet legacy systems currently using IPv4 is very large compared to those using Ipv6 at the present time, and it may take a long time before all systems using the Internet can be converted to IPv6.

Software to perform a translation from IPv4 to IPv6 has been developed. Also, dual stack IP applications for older machines have been developed that will help facilitate the transition. However, it may be desirable to move the translation between older and newer protocols from the host system level to a hardware support level. In an exemplary embodiment of an electronic communication control device, network protocol translation and IPv4 to IPv6 translation, may be performed at the network interface card (NIC) level. In such a construction the legacy host operating system may not be affected by the transition from IPv4 to IPv6. If a host system is running on IPv4 in a mixed network, then the electronic communication control device may recognize the IPv4 stack and automatically translate IPv6 for the legacy host system. Older systems can be IPv6 enabled simply by changing the existing NIC to a NIC including an electronic communication control device, possibly giving the older systems longer effective life.

Servers are sometimes outfitted with multiple Ethernet NICs and used as routers. By including NICs containing electronic communication control devices, these routers would also be IPv6 enabled. Dedicated routers could also be upgraded to IPv6 when outfitted with port adapters including an electronic communication control device. The electronic communication control device may perform the conversion process at line speed rates, thereby improving performance.

The IETF has specified a number of tools to help in the migration to IPv6, such as running a stack having an IPv4 stack and an IPv6 stack concurrently and using the appropriate version for communications. An exemplary electronic communication control device is IPv6 compliant and able to translate between IPv6 frames and IPv4 frames. When IPv4 translation is not practical, the electronic communication control device will manage the protocol internally on behalf of the host system. The change from 32-bit addressing to 128-bit addressing means that the address resolution protocol (ARP) and reverse address resolution protocol (RARP) will be quite different in IPv6. Many private networks use two sets of IP addresses: one for internal connections and one for external connections. In IPv4, internal addresses need not be valid registered addresses and, in fact, often are not. In IPv4 those addresses used for external connectivity must be valid registered addresses. The IETF has specified tools that will allow the two protocols to exist side by side within a host system. This will be a common approach during the transition from IPv4 to IPv6. A drawback to this approach is that it requires extra system resources such as memory and processing capacity. If a computer can handle the extra processing load, then a primary use of the electronic communication control device may be for communications control. However, some computer systems will be noticeably slower and burdened by the extra demand of the dual stack software implementation. The electronic communication control device can help alleviate the problem by running the IPv6 stack outside of the host system and translating the packets to IPv4 making the network appear to be IPv4 to the host system. Thus, the host system will enjoy two benefits, communications control and computer resource conservation. The electronic communication control device has the processing capacity to operate the stack at very high line speeds. Older host systems incorporating an electronic communication control device can continue to interface to an IPv6 network and interoperate, lengthening the service life of the systems.

In an exemplary embodiment of the present invention, an electronic communication control device may be designed at the chipset level, permitting the electronic communication control device to be embedded within a NIC. Router and switch communications equipment may also use line cards to interface wide area network circuitry like asynchronous transfer mode (ATM) and T1 (a digital transmission link with a capacity of 1.544 Mbps). Line cards, also called port cards, may also be equipped with an electronic communication control device of the present invention in a manner similar to a NIC, but possibly having differing characteristics from the NIC embodiment. However, it should be appreciated that the electronic communication control device of the present invention may be located within a host computer, in another processor, or in a standalone system.

In another exemplary embodiment, an electronic communication control device comprises acceleration hardware, operating software/firmware, and a user interface. The acceleration hardware comprises one or more high-speed processors, in a parallel operating arrangement, which can operate at line speeds without slowing down the network or a host system. High speed is accomplished by developing a finely tuned logic structure that can execute a complex task within a single clock cycle; similar to the way a reduced instruction set computer (RISC) executes instructions. The electronic communication control device may have a combination of RISC general instruction processors and programmable logic devices (PLDs) for processing specialized instructions.

Figure 5:
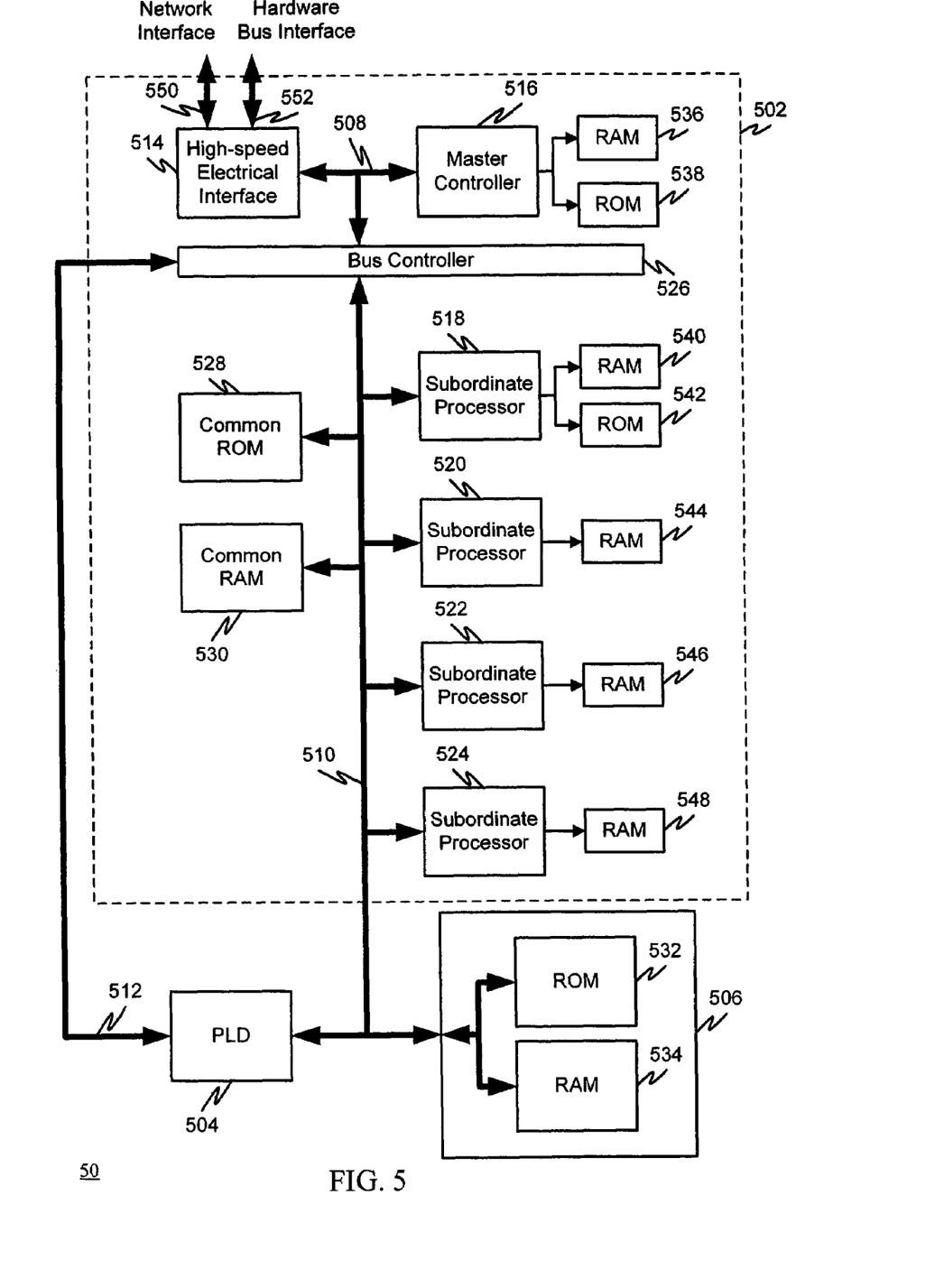
FIG. 5 is a block diagram of an exemplary chip-level architecture of an electronic communication control device in accordance with the present invention.

Further, the electronic communication control device may comprise a PLD accelerator, as shown in FIG. 5. The electronic communication control device hardware may have a number of replicated structures operating in parallel to perform specific logic operations designed to rapidly encode and decode Internet data packets. The processors of the electronic communication control device may be connected by a number of address and data busses to high-speed memory and storage memory. Hardware constructed according to the architecture of the electronic communication control device, along with control software and optional application software, forms an electronic communication control device.

For example, an electronic communication control device may be built using RISC processors and field programmable gate array (FPGA) technology, as the programmable logic device. It may be desirable that an electronic communication control device be extremely small, simple, and fast. It may also be desirable that the electronic communication control device execute a number of highly specific, unique instructions as rapidly as possible, and preferably within one processor clock cycle. The electronic communication control device architectural logic components may be small, easy to replicate and connected by multiple busses within the chip. The amount of electronic communication control device control program code may be relatively small and succinct. There are a number of applications that may be encoded within the chipset. Each RISC processor may process the same instruction set independently of other units.

Figure 1:
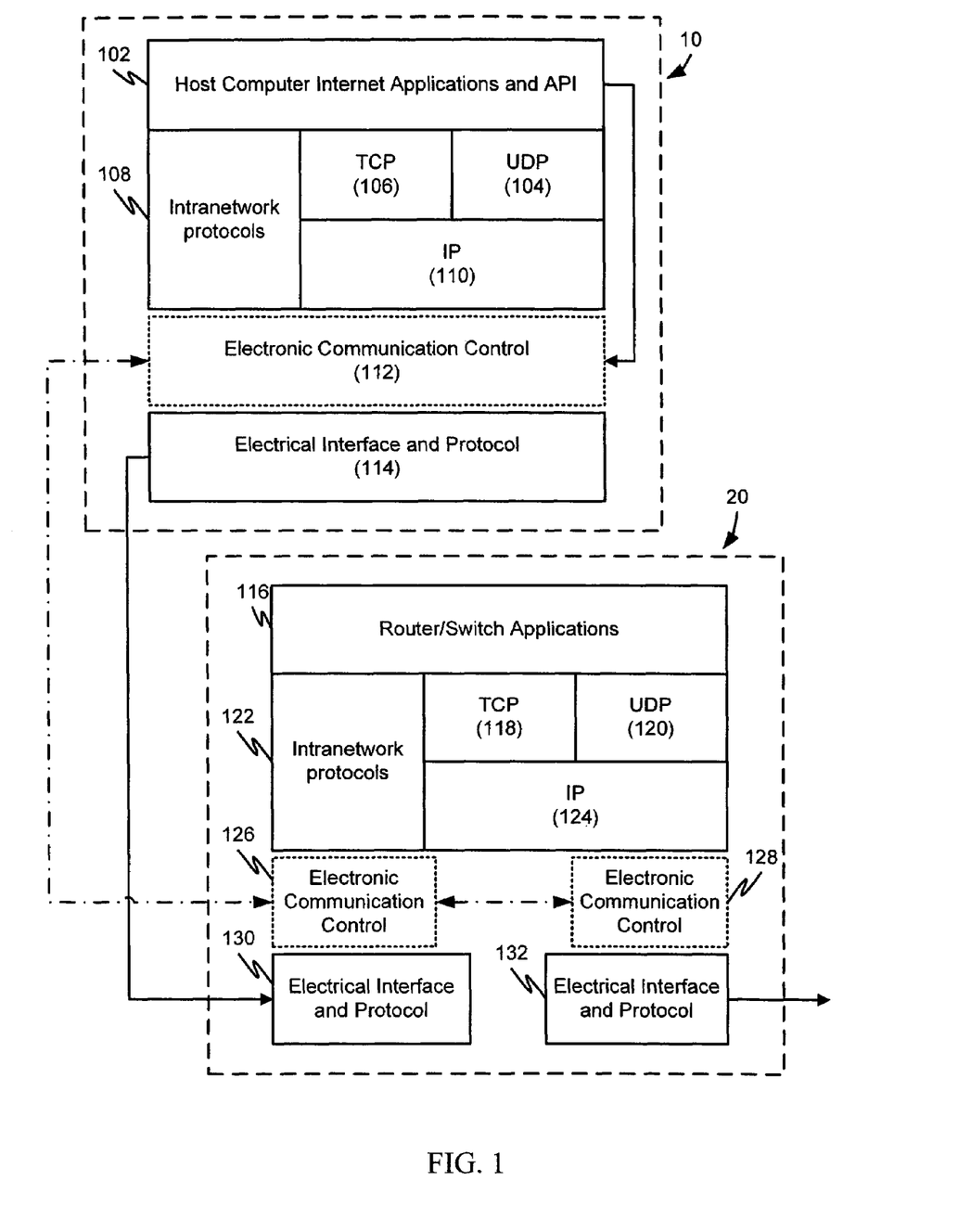
FIG. 1 is a block diagram of an exemplary embodiment of an electronic communication control device in accordance with the present invention.

In a data switch, such as a router or network switch, connections are completed by a system of logic circuitry connecting data packets by protocol rules rather than electrical signals. This is a form of logical time division multiplexing. Data switches may be analogized to mechanical sieves used for grading material according to size and shape. In a data switch, messages may be graded according to criteria contained in a connection policy table from which the connection is made. If the result of grading against the criteria is negative, the packet is not allowed to pass and a message is returned to the sender stating the reason the message was not allowed to pass. One problem with conventional switches is that the connection policy table may not be modifiable by a user to refuse unwanted connections. Another serious problem with conventional switches is that the policy table is not promulgated through the network to keep unwanted packets off larger branches of the network. The electronic communication control device of the present invention provides a potential solution to these problems. The electronic communication control device is implemented in fast microcircuit hardware that can be embedded into networking circuitry of any type and speed. FIG. 1 shows an exemplary embodiment using Ethernet because it is a common networking standard. In another example, the electronic communication control device may be embedded into router ports for specific transmission network interface matching, such as ATM, synchronous optical network (SONET), T-carrier or frame relay. By embedding the electronic communication control device into router or switch ports, older equipment may be economically upgraded. Further, the electronic communication control device can be built within new network equipment such as routers and switches, or embedded into local area network circuitry such as ten one hundred based Ethernet or Gigabit based Ethernet. The electronic communication control device of the present invention is not dependent on media type or the network interface layer of the OSI (Open System Interconnection model) or the Defense Advanced Research Projects Agency (DARPA) host-to-host interconnection model.

FIG. 1 shows an Ethernet NIC having an exemplary embodiment of the electronic communication control device constructed within a host system and within a router or switch. In particular, a user host system 10 includes host computer applications programs and application programming interfaces (API) 102, a user datagram protocol (UDP) 104 software interface layer, a transmission control protocol (TCP) 106 software interface layer, an intranetwork protocol 108 software interface layer, an Internet protocol 110 software interface layer, an electronic communication control device 112, and electrical interfaces and protocols 114 for a network protocol, such as Ethernet. A router/switch 20 includes router/switch applications 116, a TCP software interface layer 118, a UDP software interface layer 120, an intranetwork protocol software interface layer 122, an Internet protocol software interface layer 124, an electronic communication control device dedicated to Ethernet 126, an electronic communication control device dedicated to wide area networks (WAN) 128, an Ethernet electrical interface 130, and a WAN electrical interface 132.

The electronic communication control device 112 within the user host system 10 and the electronic communication control devices 126 and 128 within the router/switch 20 each comprise processing modules for a unique protocol used to communicate exclusively with other electronic communication control device equipped network equipment, a dual TCP/IP stack (for example, having one IPv4 stack and one IPv6 stack), packet analysis, multiplex applications, protocol translation (such as, IPv4 to IPv6), and encryption/decryption.

In operation, Ethernet control signals pass through the electronic communication control device 112 and are processed as needed before being sent to the Ethernet electrical interface 114. The Ethernet electrical interface 114 has registers for storing information needed to construct an Ethernet frame. The Ethernet electrical interface is set up for a transmission sequence and data is fed through the computer interface to the Ethernet electrical interface, which builds an Ethernet frame and transmits it. The Ethernet electrical interface listens for packet collisions from the network using collision sense multiple access with collision detection methods (CSMA/CD), which is part of the Institute of Electrical and Electronics Engineers (IEEE) 802.3 Ethernet standards. If a packet is correctly received, the circuitry sets register values that can be read by the computer interface circuitry and the next data packet is processed. If the sent packet was not well received, the sent packet is retransmitted. The process is repeated until the host computer has transmitted all the packets associated with an Ethernet transaction.

Ethernet usually has two types of communications associated with it. One is intranetwork (i.e. staying within the Ethernet) and the other is internetwork (i.e. crossing over into a routed network). The intranetwork Ethernet frames are managed by protocols like IPX or NetBIOS. There are standards for computer applications to access the Network Driver Interface Specification (NDIS) directly or they can rely on standards like IPX, Sequential Packet exchange (SPX) or NetBIOS. This gives applications a way to make transactions over the Ethernet. In the internetwork environment, the standards govern how specific operations are performed, like email and hypertext. Internet web browser technology has evolved to a point where transactions can be carried on through the browser interface. Email is similar in that hypertext messages can toggle between an email application presentation and a browser presentation. These kinds of data packets go over the routed network and involve TCP/IP.

In the transition period when IPv4 and IPv6 may both be present, an electronic communication control device may be of value in translating between IPv4 and IPv6. Any confusion during a transition period may also provide an opportunity for further network abuse, such as sending unwanted communications. An electronic communication control device in accordance with the present invention may reduce or eliminate network abuse. An exemplary embodiment of an electronic communication control device as shown in FIG. 1, may be coupled in the critical path from the network to the computer. The electronic communication control device may operate in IPv4 and in IPv6, translating between the two as needed.

FIG. 1 shows how an electronic communication control device of hardware and software can be implemented into an existing NIC design and populated into a user computer. The user computer need not be aware of the electronic communication control. The electronic communication control device can operate according to Ipv4, IPv6, or any newer IP protocol. The hardware consists of programmable logic devices designed to operate an exclusive instruction set, thus making the hardware operation very fast.

Parallel processing, when coupled with programmable logic, can be implemented at the microcircuit level. Performing short, highly repetitive analysis tasks on fast moving inline data, such as may be required for electronic communication control, is a situation that is well suited for parallel processing techniques. The electronic communication control device is a chipset having parallel processors with embedded software that can be constructed to fit within a NIC design or router port design.

In operation, the electronic communication control device interfaces the Ethernet logic hardware at the electrical level on one side and the bus processor logic on the other side as shown in FIG. 1. Logically it interfaces the host computer Internet Protocol. It also interfaces with other protocols that coexist with IP such as Novel's Internetwork Packet eXchange (IPX) and Microsoft's Network Basic Input/Output System (NETBIOS), which are primarily for intranetwork use, whereas IP is for routed network use. Above the IP layer are the Transmission Control Protocol (TCP) and User Datagram Protocol (UDP) layers. These protocols in turn interface the application layer. The electronic communication control device can perform packet analysis up through the protocol stack to the application layer. The electronic communication control device can use IPv6 and can translate to IPv4, or another protocol, for the local host. The local host is not aware of the translation. Special translation software is not required for the host. The electronic communication control device analysis will correctly identify if the local host is using IPv4 and perform translation. If the local router is not IPv6 compliant, then the electronic communication control device will use the most appropriate method to interface with the router. The electronic communication control device has a communication software method that seeks out other electronic communication control devices in the IP path. This adds a small amount of overhead to the communication. It allows the electronic communication control device to communicate data, such as, for example, policy table elements to distant electronic communication control devices.

Another function of the electronic communication control device is to gather information for path connections. It is possible that routers along the path may not share path connection information. The electronic communication control device has an alternative method to gather this information.

The electronic communication control device protocol can be tunneled within the connection so the router and other computers are not aware of this logical link. This type of covert connection is represented by the dashed line connecting the electronic communication control device 112 and the electronic communication control device 126 shown in FIG. 1. Also, the electronic communication control devices 126 and 128 may communicate using covert messages placed within normal network traffic. The use of encryption is selectable.

In order to more fully appreciate the advantages of the electronic communication control device, it may be helpful to contrast it with a conventional NIC.

Figure 2:
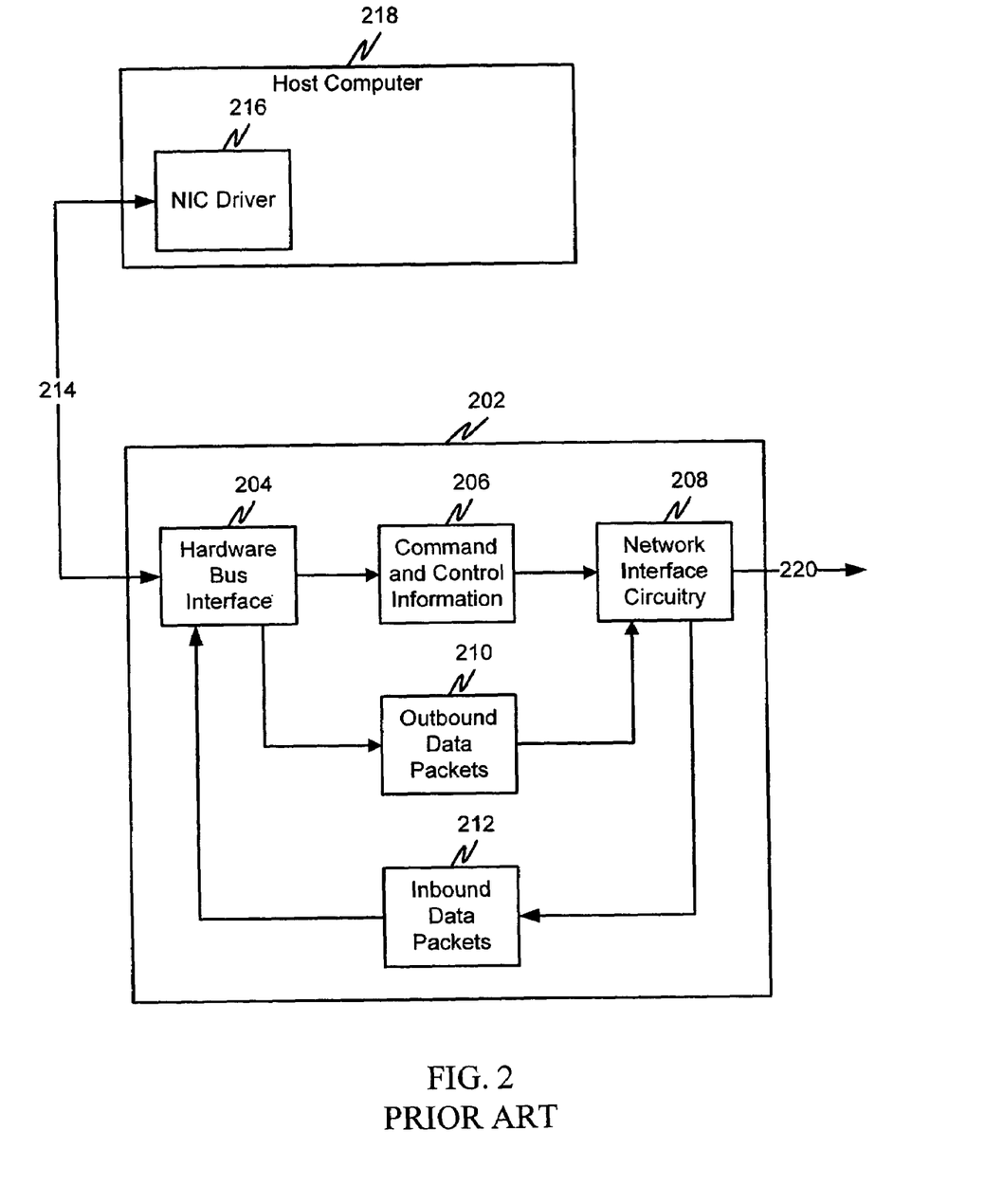
FIG. 2 is a diagram showing a conventional network interface.

FIG. 2 is a diagram showing dataflow within a conventional NIC. In particular, within a NIC 202, there is a hardware bus interface 204, command and control information 206, network interface circuitry 208, outbound data packets 210, and inbound data packets 212. The host computer 218 includes a bus 214 and a NIC driver software module 216. There is also a local area network (LAN) connection 220, such as, for example, Ethernet. The LAN connection 220 is coupled to the NIC card 202.

The hardware bus interface 204 provides an interface from the NIC 202 to the computer 218. The computer 218 has a bus 214 through which the NIC 202 is connected to the computer 218. Through the hardware bus interface 204 the NIC 202 receives power, command and control signals, and data packets. An example of a hardware bus interface is the Peripheral Component Interconnect (PCI) specification. PCI specifies the bus control and arbitration signal scheme that devices must follow to use the bus. This bus is very common to many types of computer systems. Another form of NIC interface is one that is integrated with the computer motherboard. In the personal computer field, one example is the NIC controlled by a chipset called a Southbridge that interfaces a LAN chipset. These directly interfaced systems are very fast and bypass any PCI interface limitations.

Whether in a NIC or on a motherboard, the LAN chipset is initialized and set up for operation by using command and control signals. These signals tell the computer that the LAN is up and operating normally. They also communicate to the system the state of the LAN chipset, which includes conditions such as data coming in, LAN signal collisions, hub failures and other network states. When the computer has LAN traffic to pass, the packets must be formed according to a specific format to meet the rules of a Network Topology. Ethernet frame construction is a good example of how data is prepared for transmission within the NIC to comply with Ethernet topology.

A NIC connects a computer workstation or server to a LAN. There are two interconnections. One interconnection is to the LAN cabling system and the other is to the computer system bus. A typical bus, such as a PCI bus, may provide a means to send control signals and information to the NIC. There is circuitry in the NIC to generate the control signals for the LAN. These control signals follow the LAN protocol, for example Ethernet. It could also be other forms of Ethernet such as Gigabit Ethernet. It could be Fiber Channel. The NIC driver is a software component executing on the host computer that is designed to communicate with the NIC and the driver's function is to take high order commands and translate them to low-level instructions. For example, a high level command may be "Send(address,P,count)" where address is the numerical address of a station on the LAN, P is a pointer to a location in memory, and count is the number of bytes to pull from memory. The driver takes this directive and arranges a series of low level commands that will implement the command. The low level commands may read a series of registers to first ascertain the status of the NIC. If the status is acceptable, for example carrier present, then the driver next may set a register and strobe to accept a first data byte located at memory location P. The driver may then fetch the byte at the next location and repeat this process until the count is fully satisfied, while checking the NIC status to see if the register has received each byte. The driver may then request a checksum from the NIC and compare to the checksum the driver computed. If the checksums match then the driver will release a signal to send the data onto the LAN cable. Then NIC will exchange checksums with the remote computer and compare the two. If the comparison is valid then the results will be made available to the driver.

In the present inventor's analysis of the prior art shown in FIG. 2, the driver is in the path of the data being transmitted and received. But the purpose of the driver is to operate the NIC on behalf of the application and operating system. Therefore, the present inventor has determined that it can be problematic to task the driver with any other function that could interfere with its primary function. The NIC card has a limited number of functions it can perform. It can send data and receive data according to the protocol rules of the LAN. It can test the LAN and perform some level of diagnostics on the LAN and on itself.

Because the NIC is in the critical path between the computer and the network it is a good place to locate a traffic control system. At the location of the NIC in the system it may be difficult to interfere with the electronic communication control device operation since it may not respond directly to the driver or operating system from the host machine. In contrast, traffic control software at the application layer under an operating system can only be equal to any other application for system resources and thus is easy to interfere with because it is possible for a remote computer to attach to the operating system by way of an open port and modify the traffic control software. A program can be written around the rules, as the only thing needed is opportunity to gain entry. For example some JavaScript code has been found to make it appear that a request for unwanted advertisement comes from the local machine. This happens without the knowledge or permission of the user. The request for unwanted web pages seems to have been generated locally when, in fact, is was done remotely. Sometimes this type of code is referred to as spy ware.

Figure 3:
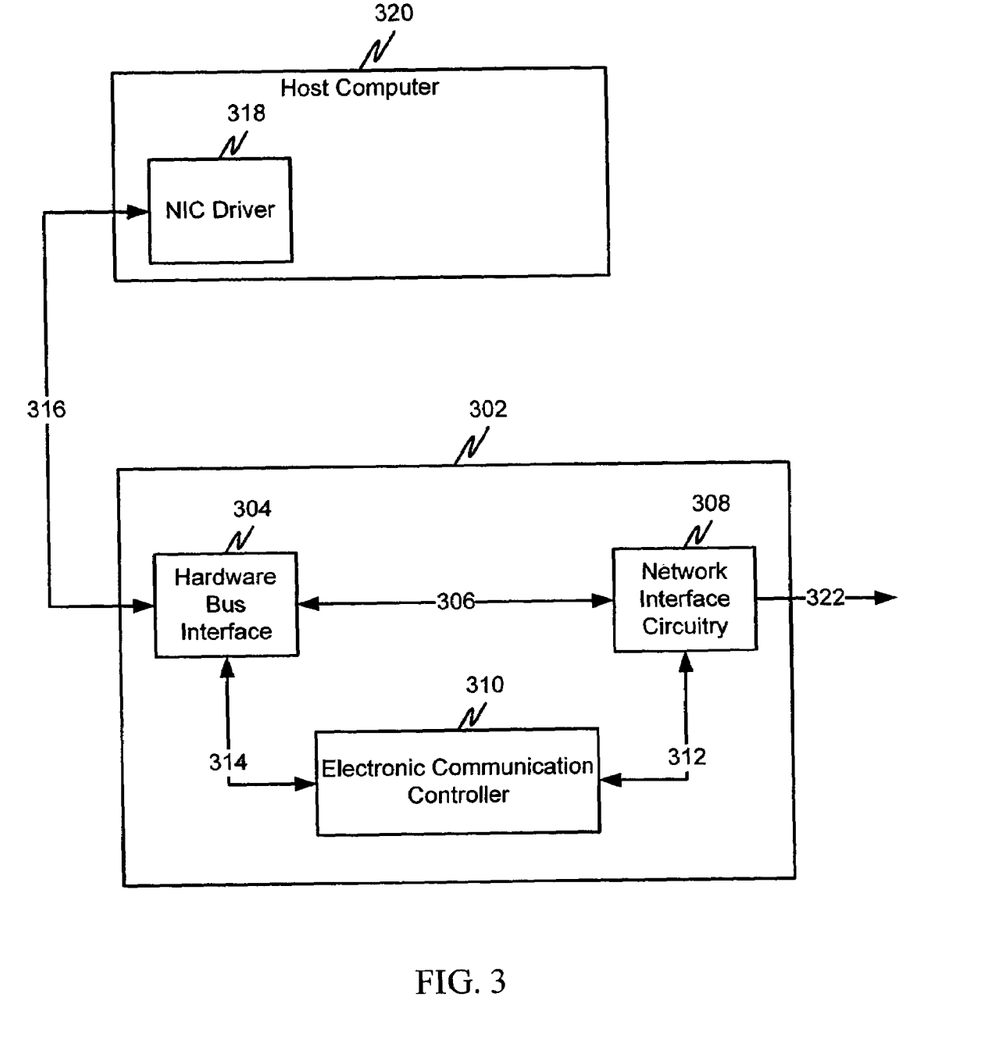
FIG. 3 is a block diagram of an exemplary network interface adapter having an electronic communication control device in accordance with the present invention.

The location of a NIC card in the critical path between the computer and the network is a property that allows the electronic communication control device to perform communication control functions while remaining resistant to software tampering measures. FIG. 3 shows an example of an electronic communication control device constructed in a NIC. This construction may not require changes to the operating system or the driver.

Figure 4:
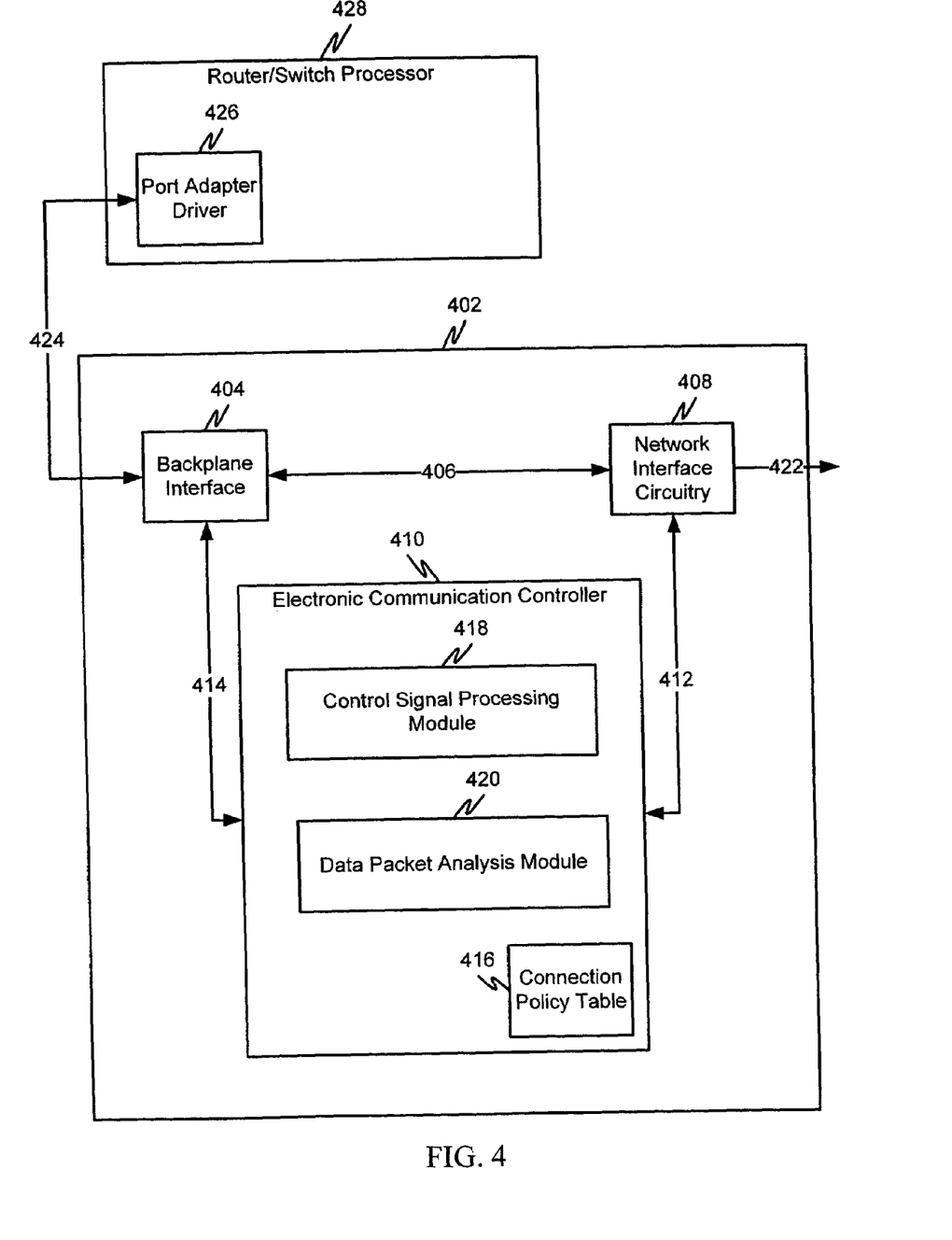
FIG. 4 is a block diagram of an exemplary line card for use in a router or switch having an electronic communication control device of the present invention.

FIG. 3 is an example of the preferred embodiment in a NIC form and FIG. 4 is an example of the preferred embodiment in a port adapter form. The NIC embodiment may be typically used for computer systems, whereas the port card embodiment may typically be used for routers and switches. A difference between the NIC and port adapter variants of the electronic communication control device is that the NIC requires a driver to operate the system, whereas the port adapter may be autonomous. A port adapter card may run by itself without intervention. There may be a port adapter driver in the switch or router that performs setup and diagnostics. Setup may be needed to select modes of operation or feature sets while diagnostics may be performed intermittently during operation.

Referring to FIG. 3, within the NIC 302 there is a hardware bus interface 304, a virtual data path 306, network interface circuitry 308, an electronic communication control device 310, a network data path 312, and a host data path 314. The host computer 320 includes a NIC driver 318 and a bus 316. There is also a network interface 322 coupled to the NIC 302.

Data coming into the NIC 302 travels from the network interface circuitry 308 to the electronic communication control device 310 via the network data path 312. The electronic communication control device 310 processes the data. Once the data has been processed and is determined to be allowable to pass to the host computer, it travels to the hardware bus interface 304 via the host data path 314.

The virtual data path 306 is assumed by the NIC driver to be the path used by incoming and outgoing data. In fact, the incoming and outgoing data are routed to the electronic communication control device 310 over the host data path 314 and the network data path 312. The NIC driver may command the hardware bus interface 304 or the network interface circuitry to perform a test or report status and the electronic communication control device 310 may allow those commands and responses to pass unmodified between the NIC 302 and the host computer 320.

In a LAN there may be several network computers attached along with a number of other devices. For example, a print server may be attached to the network. Other examples include a network file system (NFS) that may be attached as a redundant array of independent disk drives, tape transport or other such data storage system along with a dedicated intelligent network adapter. These devices may use a protocol that does not exist outside of the LAN environment and so may not be accessible from other systems outside the LAN. However, some may use TCP/IP and would be accessible over the Internet. Wireless hubs may be attached to a LAN. Wireless hubs often employ connection tables listing the Ethernet Address of each wireless NIC device that is allowed to use the wireless hub. This is a very safe way to control access to one side of the hub. Wireless NIC cards also have encryption circuitry that also limits access, but there is less security on the wireless side since radio receivers can recover the wireless data packet and crack encryption keys and thus allow abuse. The wire side provides limited secure access and thus the NIC Ethernet address has greater security value.

Ethernet is discussed by way of example and it should be appreciated that the electronic communication control device applies to any LAN, or other network, technology. Ethernet frame (IEEE 802.3) construction is required for data prepared for transmission over the Ethernet cable. Ethernet considers the IP datagram a payload like any other protocol payload within the IEEE 802.3 frame. The frame includes a preamble followed by a destination node address, a source node address, two octets defining frame type, an IP datagram payload, and, lastly, a CRC checksum. This frame is trustworthy within the LAN environment because the source and destination fields contain unique, non-changeable addresses burned into the NIC card at the time of manufacture. It is possible to modify a burned in address but only with great difficulty. In contrast, IP addresses are not burned in. They are entered by the user or administrator and can range from a valid registered address to an invalid unregistered address that meets number range requirements. In IPv4, dynamic host configuration protocol (DHCP) automates the generation of addresses. DHCP operated with network address translation (NAT) has been useful in protecting data networks. For example, by tradition the TCP/IP address 10.10.10.xx.255.255.255.0 is reserved for experimental networks. This address could be used on the private side of NAT. Ethernet is similarly protected.

A "spoof" is typically defined as deceiving for the purpose of gaining access to someone else's resources (for example, to use a fake Internet address so that one looks like a certain kind of Internet user or server). Spoofing a NIC Ethernet address may require advance knowledge of existing valid addresses and snooping access to the LAN wiring. The spoofing user would need to be within the private side. This is exactly what NAT tries to do, prevent outside systems from snooping into a LAN. But it can only be partially effective because of architectural issues. If a spoofing user has access to Ethernet cables then the spoofing user could devise a non-conflicting address to use to then attach to the LAN. The spoofing user still needs access to Ethernet cables to send or receive communications. These trustworthy Ethernet addresses do not leave the LAN environment because the router or switch strips these addresses from the frame as it reformats the packet for an entirely different protocol.

According to IPv6 RFC 2373, routers must not forward any packets with link-local source or destination addresses to other links. In IPv6, the first three octets in binary of an 64-bit extended unique identifier (EUI-64) are written in Internet standard bit-order where "u" is the universal/local bit, "g" is the individual/group bit, and "c" is company_id. Also, routers must not forward any packets with link-local source or destination addresses to other links. Routers must not forward any packets with site-local source or destination addresses outside of the site. The rules for router communications are changing in the conversion from IPv4 to IPv6. RFC 2464 stipulates that IPv6 packets are transmitted in standard Ethernet frames. The Ethernet header contains destination and source Ethernet addresses per the Ethernet 802.3 specification. The Ethernet payload contains the IPv6 header and IPv6 payload with padding to meet required frame size. The Ethernet interface ID is based on EUI-64 identifier, which comes from the NIC built-in 48-bit IEEE 802 address. In IPv6, only an interface can have an address or identifier. The interface address is formed from the EUI-64 by setting the "u" bit to the correct value. Also, in IPv6, an interface's built-in address is expected to be universally administered and to be unique. A universally administered IEEE 802 address or an EUI-64 is signified by a 0 in the "u" bit position, while a globally unique IPv6 Interface Identifier is signified by a 1 in the corresponding position. When the router sees the correct value the packet can be sent over the routed network, otherwise, the address stays local. Thus, TCP/IP can be used within the LAN directly and leading to an elimination of the need for DHCP and NAT.

In FIG. 4, a router or switch port adapter 402 comprises a hardware/software interface to a backplane 404, a virtual data path 406, network interface circuitry 408, and an electronic communication control device 410. The electronic communication control device 410 comprises a connection policy table 416, a control signal processing module 418 and a data packet analysis module 420. A router or switch processor 428 connects through a port adapter driver 426 via a backplane 424 to the router or switch port adapter 402. A network connection 422 is coupled to the port adapter 402.

In operation, the electronic communication control device 410 processes any control signals and responses in the control signal processing module 418. The data packet analysis module 420 analyzes data packets and, and among other things, compares and matches senders and receivers using the connection policy table 416 and identifies and communicates with the electronic communication control devices using open or covert protocols.

Referring back to FIG. 3, the electronic communication control device 310 may have an internal construction similar to the electronic communication control device 410 of FIG. 4.

FIG. 4 shows how the electronic communication control device could be implemented as a port adapter module for a router or switch. Routers and switches are often constructed to be modular so that the basic unit has a backplane with multiple positions for circuit card modules with a back plane connector and a telecommunication network connector. The purpose of the circuit card, also called a port module or port adapter, is to configure a router or switch with a specific telecommunications network capability. Examples of telecommunication networks include fiber, T-Carrier, ATM or SONET. A router or switch may have many port modules installed. The electronic communication control device can be integrated into a port module to provide the electronic communication control device capability to the basic port module unit. Another example is a router or switch constructed with the electronic communication control device built into the router or switch instead of being constructed into each port adapter. In this embodiment the router or switch would still have the same the electronic communication control device capability as a router or switch with the electronic communication control device within each port module. The electronic communication control device enabled router ports can recognize other electronic communication control device routers or switches and the electronic communication control device enabled hosts.

FIG. 5 shows an exemplary embodiment of an electronic communication control device 50 in accordance with the present invention. Specifically, FIG. 5 shows an embodiment comprising a three-chip (three semiconductor device) solution. The three basic hardware elements of the electronic communication control device hardware are the accelerator, processor, and memory. The first semiconductor device is a communication control processor 502. The second device is a PLD hardware accelerator 504. And the third semiconductor device is a memory module 506.

The communication control processor 502 comprises a high speed electrical interface 514 coupled to a network interface 550, a hardware bus interface 552, a first bus 508, a master controller 516, a local RAM 536, a local ROM 538, a bus controller 526, a second bus 510, common ROM 528, common RAM 530, and subordinate processors 518-524.

In FIG. 5, the RISC master controller and subordinate processors may be Power PCs, for example, or any type of processor. The first bus 508 connects the high-speed electrical interface 514 with the master controller 516 and the bus controller 526. The second bus 510 connects the subordinate processors 518-524 to the bus controller 526, the common ROM 528, the common RAM 530, the PLD hardware accelerator 504, and the memory module 506. The third bus 512 connects the bus controller 526 and the PLD hardware accelerator 504. A control system operates on the master controller 516.

For example, the control system for the second bus 510 could be arbitrated such that requests for bus access may appear over several control lines and each device on the bus has a control line to the bus controller 526. In addition, the master controller 516 may set bus access priority among the devices based on a performance loading algorithm where the state of each device on the bus is monitored by the master controller 516, which, in turn, signals the bus controller 526 as to the order of priority. For example, if the PLD 504 were stalled because it had data to send and could not wait for the other devices, then it may be granted higher priority. If a subordinate processor were stalled and needed to be reset, it may be placed at the bottom of the priority list since it may not have a significant impact on device operation.

In operation, the PLD 504 may be much faster than any subordinate processor, so the PLD 504 may merit a dedicated high speed bus back up through the bus controller 526 to the high speed interface 514.

The communication control processor 502 may be designed in various ways based upon contemplated uses of the invention. For example, the bus architecture may be arranged differently and memory may be arranged differently. Further, the communication control processor 502 may associate parallel processing techniques with internet communication management. Thus, the exemplary embodiment of an architecture comprising a master controller, a high speed electrical interface, and a uniquely designed PLD to execute complex tasks such as de-convolving a frame in a single operation cycle may be desirable. Further, it may be desirable for the second bus 510 to have a data width equal to the frame width. And ROM and RAM may be incorporated directly into the communication control processor 502, as in a one- or two-chip solution.

The master controller includes a local RAM 536 and a local ROM 538. The first subordinate processor 518 includes a local ROM 540 and a local RAM 542. The second subordinate processor 520 includes a local RAM 544. The third subordinate processor 522 includes a local RAM 546. The fourth subordinate processor 524 includes a local RAM 548.

The memory module 506 is comprised of a ROM 532 and a RAM 534 memory.

The high-speed electrical interface circuitry 514 is coupled to the network connection 550 and the host computer connection 552.

Although a specific distribution and configuration of processing and memory is shown in FIG. 5, it should be appreciated that the electronic communication control device of the present invention may be distributed, or co-located, and configured in various ways in accordance with a contemplated use of the invention.

In operation, the master controller 516 manages the activity of each subordinate processor (518-524). For example, an incoming high-speed data packet may be separated from the serial data stream and sent to a subordinate processor for processing. This process may be repeated for each data packet, until all subordinate processors are fully utilized. Each individual unit may operate at relatively slow clock speeds, or may operate at relatively high clock speeds. Together, the subordinate processors, operating in parallel may process large amounts of data at line speeds. The master controller 516 attempts to keep the electronic communication control device continuously busy and as fully utilized as possible.

Data communication interface structures match the gate array of the PLD with high-speed I/O channels. The electronic communication control device operates within the network interface adapter environment in conjunction with common signaling circuitry.

FIG. 5 shows an example of how the electronic communication control device could be designed from standard logic libraries and field programmable gate arrays (FPGA). A NIC can be designed to cover a large range in data connection speeds including Gigabit Ethernet. The electronic communication control device is designed to keep up with NIC operating speed. FIG. 5 also illustrates the parallel processing architecture of the electronic communication control device. Using the power and speed of the parallel processing architecture, the electronic communication control device can keep up with various LAN topologies and protocols. While FIG. 5 is an example, it should be appreciated that there are other arrangements that could work equally well. While a three chip solution is shown in FIG. 5, it should be appreciated that other alternatives are possible, such as, a two-chip solution or a one chip solution.

Speed is a major factor in determining a specific chip solution. More speed may require more parallel processors, which in turn may use more substrate surface area. FIG. 5 shows a total of five processors, for example Power PC RISC cores, stenciled onto the semiconductor device. The number of processors shown is for illustration purposes. It should be appreciated that the electronic communication control device may need only one subordinate processor. Further, the hardware accelerator PLD 504 can function as a subordinate processor executing specialized instructions. These specialized instructions could, for example, decode an entire packet in a single clock cycle and store the component variables in memory where the subordinate processor can operate on the data with general RISC instructions. By using accelerator hardware, a parallel processor could decode an incoming packet while the RISC is processing a previous packet. The accelerator can also build the packet in the same way as it was disassembled. The feature of providing a custom accelerator with the RISC processors or PLD allows the electronic communication control device to operate in real time. By way of example let the clock speed be 100 MHz or 0.1 microseconds per cycle. The accelerator PLD may decode a 1500 bit packet in one cycle. Checking the communications policy table may require 4 clock cycles. Retransmitting back into the PCI may take 1 clock cycle to reach the interface circuitry. Thus, the total elapsed time to decode, check and retransmit is 0.6 microseconds. Packets that are not allowed to pass will break out of real time and can be handled by queue management. Therefore, real time only applies to packets cleared to pass. The 0.6 microsecond delay will not affect streaming audio or video. In practice a transaction must first be setup by protocol and the electronic communication control device can clear subsequent packets faster than the first packet so clearly all packets do not suffer the same processing delay. In 0.6 microseconds in a Gigabit Ethernet system, which is a serial system, 600 bits would be clocked into the receiver. If a packet were 1500 bits it would take 2 microseconds to receive a packet and 2 milliseconds to receive a packet in standard 10 MHZ Ethernet.

Two properties of digital circuits are uniquely combined to create the operating speed of the electronic communication control device: clock speed and logic architecture. Logic architecture refers to a bus architecture for multiple parallel transfers. For example, in FIG. 5 suppose there is one independent parallel bus for each RISC processor containing X number of address lines and 32 data lines. Only a small number of address lines are required because of finite memory. If total on chip addressable memory were limited to less than 32 Meg of RAM and ROM then 15 address lines per processor plus 32 data lines and 4 chip select lines would bring the total to 51 lines. The chip select lines signal the bus controller which device on board the processor to connect to. Four lines means a processor could connect to 16 devices. The off chip portion of the bus counts as one on chip device. Each processor performs analytical work utilizing a second address and data bus for private memory. Data operations within private memory do not necessarily affect the bus controller.

Data packet headers may be fixed. A large FIFO could receive a data packet and input it into one large register where in one operation each header variable could be separated and stored in memory. The memory can be a common memory accessed by the processors. Thus, each RISC processor has more time to process data. Additional processors can be added until the physical die space is consumed. Other factors related to packaging and pin management may come into play.

In the exemplary embodiment shown in FIG. 5, the chipset is interconnected and includes a high-speed parallel bus architecture. The first bus 508 interconnects the master controller 516, the high-speed electrical interface 514 and the bus controller 526. The second bus 510 interconnects the electronic communication control device processor unit, the PLD hardware accelerator 504 and the memory module 506. The second bus 510 ties together all three chips. The third bus 512 interconnects the bus controller 526 and the hardware accelerator 504.

Each of the three buses is terminated and controlled by the bus controller 526. The first bus 508 is a simple bus connecting the master controller 516, high-speed electrical interface 514 and bus controller 526. Internet data packets are processed via the high-speed electrical interface 514. The master controller 516 keeps track of Internet transactions. It assigns a subordinate processor (518-524) to a transaction. For example if a transaction were email where jsmith@xyz.com connected to an IMAP server, then the master controller 516 may assign the third subordinate processor 522 to all data packets associated with that transaction. If the third subordinate processor 522 has additional capacity then the master controller 516 can add additional transactions to the third subordinate processor 522 tasks.

A subordinate processor can be assigned additional transactions until processing capacity is nearly full. Packets are received and transmitted through the high speed interface, which may be a serial or parallel interface. A serial interface is shown for illustrative purposes and it should be appreciated that other interfaces could be used, for example, a parallel interface. The bus controller can organize the incoming packet and put it into temporary storage in preparation for assignment to a subordinate processor. The master controller 516 assigns the incoming packet to the third subordinate processor 522 and provides an address where the packet is stored. The third subordinate processor 522 can signal the bus controller 526 to send the packet to the accelerator 504 by way of the third bus 512 and, by way of the second bus 510, instruct the accelerator 504 to decode the packet and store the results in the memory module 506 along with an image of the original packet. In this example, the incoming packet is compared to the policy table managed by the master controller 516 and is allowed to pass the interface. The third subordinate processor 522 signals the master controller 516 that the packet is good and sends the original packet image back to the bus controller 526 where it is input to the high-speed electrical interface 514 for transmission across the PCI Bus to the host computer.

The master controller 516 has local RAM 536 and local ROM 538. The local ROM 538 contains the executable program to perform basic operations and boot the system to the main ROM 532 on the second bus 510. The main ROM 532 stores the analytical and operational software. The main RAM 534 serves as a common storage system between the subordinate processors and the accelerator 504. For example, the communications policy table could be stored here. The memory module 506 provides additional software storage and a storage area for non-real-time processing.

The electronic communication control device, as shown in the above figures, may be implemented on a general-purpose computer, a special-purpose computer, a programmed microprocessor or microcontroller and peripheral integrated circuit element, and ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions described herein can be used to implement an electronic communication control device according to this invention.

Furthermore, the disclosed electronic communication control device may be readily implemented in software using object or object-oriented software development environments that provide portable source code that can be used on a variety of computer platforms. Alternatively, the disclosed electronic communication control device may be implemented partially or fully in hardware using standard logic circuits or a VLSI design. Other hardware or software can be used to implement the systems in accordance with this invention depending on the speed and/or efficiency requirements of the systems, the particular function, and/or a particular software or hardware system, microprocessor, or microcomputer system being utilized. The electronic communication control device illustrated herein can readily be implemented in hardware and/or software using any known or later developed systems or structures, devices and/or software by those of ordinary skill in the applicable art from the functional description provided herein and with a general basic knowledge of the computer and network communication arts.

Moreover, the disclosed electronic communication control device may be readily implemented in software executed on programmed general-purpose computer, a special purpose computer, a microprocessor, or the like. In these instances, the electronic communication control device of this invention can be implemented as a program embedded on a personal computer such as a JAVA® or CGI script, as a resource residing on a server or graphics workstation, as a routine embedded in a dedicated encoding/decoding system, or the like. The system of the electronic communication control device can also be implemented by physically incorporating the electronic communication control device into a software and/or hardware system, such as the hardware and software systems of network communication equipment.

It is, therefore, apparent that there is provided in accordance with the present invention, an electronic communication control device. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A network interface for multiplex control of electronic communications, said network interface comprising:
    a master control processor including:
        a storage module to store information; and
        a processing module to analyze network data traffic and to provide multiplexing control by blocking unwanted traffic and matching senders with receivers, wherein the master control processor is disposed in a data path between a network and a host processor such that multiplexing control is performed prior to message data being processed by the host processor;
    a host interface configured to couple the network interface to the host processor;
    an electronic communication interface configured to couple the network interface to the network;
    a first bus coupled to the master control processor, the host interface, and the electronic communication interface;
    a bus controller, configured to control bus communications, coupled to the first bus, a second bus, and a third bus;
    an accelerator, including a configurable logic portion, coupled to the second bus and the third bus; and
    a storage module, coupled to the second bus.

2. The network interface of claim 1, further comprising at least one electronic communication protocol stack.

3. The network interface of claim 1, further comprising means for processing electronic communication data packets.

4. The network interface of claim 1, further comprising at least one subordinate processor, including a processing module and a subordinate processor storage module, wherein the subordinate processor is responsive to the master processor and coupled to the second bus.

5. The network interface of claim 4, further comprising at least one common data storage module coupled to the second bus.

6. The network interface of claim 1, further comprising means for electronic communication protocol translation.

7. The network interface of claim 1, further comprising means for policy table creation.

8. The network interface of claim 1, further comprising means for policy table management.

9. The network interface of claim 1, further comprising means for control signal processing, wherein a control signal intended for the electronic communication interface is received from a host computer and processed before being transmitted to the electronic communication interface.

10. An electronic communication line card for multiplex control comprising:
    a master control processor including:
        a storage module to store information; and
        a processing module to provide multiplexing control by matching senders with receivers, wherein the master control processor is disposed in a data path between a first network and a second network such that multiplexing control is performed prior to message data being processed by a host processor;
    a backplane interface configured to couple the line card to the host processor;
    an electronic communication interface configured to couple the line card to the first network and the second network;
    a first bus coupled to the master control processor, the backplane interface, and the electronic communication interface;
    a bus controller, configured to control bus communications, coupled to the first bus a second bus, and a third bus;
    an accelerator, including a configurable logic portion, coupled to the second bus and the third bus; and
    a storage module, coupled to the second bus.

11. The electronic communication line card of claim 10, further comprising means for control signal processing, wherein a control signal intended for the electronic communication interface is received and processed before being transmitted to the electronic communication interface.

12. The electronic communication line card of claim 10, further comprising means for processing electronic communication data packets.

13. The electronic communication line card of claim 10, further comprising means for policy table creation.

14. The electronic communication line card of claim 10, further comprising means for policy table management.

15. An electronic communication control device comprising:
    a master control processor including:
        a storage module to store information; and
        a processing module configured to analyze network data traffic and to provide multiplexing control by blocking unwanted traffic, wherein the master control processor is disposed in a data path between a network and a host processor such that multiplexing control is performed prior to message data being processed by the host processor;
    a host interface configured to couple the electronic communication control device to the host processor;
    an electronic communication interface configured to couple the electronic communication control device to the network; and a first bus coupled to the master control processor, the host interface, and the communication device interface;

a bus controller, configured to control bus communications, coupled to the first bus, a second bus, and a third bus, wherein the master control processor, the common data storage elements, the host interface, and the electronic communication device interface are each coupled to the second bus;

an accelerator, including a configurable logic portion, coupled to the second bus and the third bus, wherein the accelerator is constructed to operate as a processor subordinate to the master processor; and a storage module, coupled to the second bus.

16. The electronic communication control device of claim 15, wherein the storage module comprises a nonvolatile portion and a volatile portion.

17. The electronic communication control device of claim 15, further comprising at least one subordinate processor, including a processing module and a subordinate processor storage module, wherein the subordinate processor is responsive to the master processor and coupled to the second bus.

18. The electronic communication control device of claim 15, further comprising at least one common data storage module coupled to the second bus.

19. The electronic communication control device of claim 15, wherein the electronic communication control device is contained within an electronic communication device.

* * * * *